Aug. 24, 1926.

I. S. PARKEY 1,597,620

DITCHING AND LOADING MACHINE

Filed Sept. 19, 1925    2 Sheets-Sheet 1

Inventor

I. S. Parkey,

By _____ Attorney

Aug. 24, 1926.  
I. S. PARKEY  
1,597,620  
DITCHING AND LOADING MACHINE  
Filed Sept. 19, 1925   2 Sheets-Sheet 2

Inventor  
I. S. Parkey.  
By  
Attorney

Patented Aug. 24, 1926.

1,597,620

UNITED STATES PATENT OFFICE.

ISAAC S. PARKEY, OF PENNINGTON GAP, VIRGINIA, ASSIGNOR OF ONE-FOURTH TO JAMES H. SMITH AND ONE-FOURTH TO CHARLES L. HOLBROOK, BOTH OF PENNINGTON GAP, VIRGINIA.

DITCHING AND LOADING MACHINE.

Application filed September 19, 1925. Serial No. 57,479.

Figure 1:
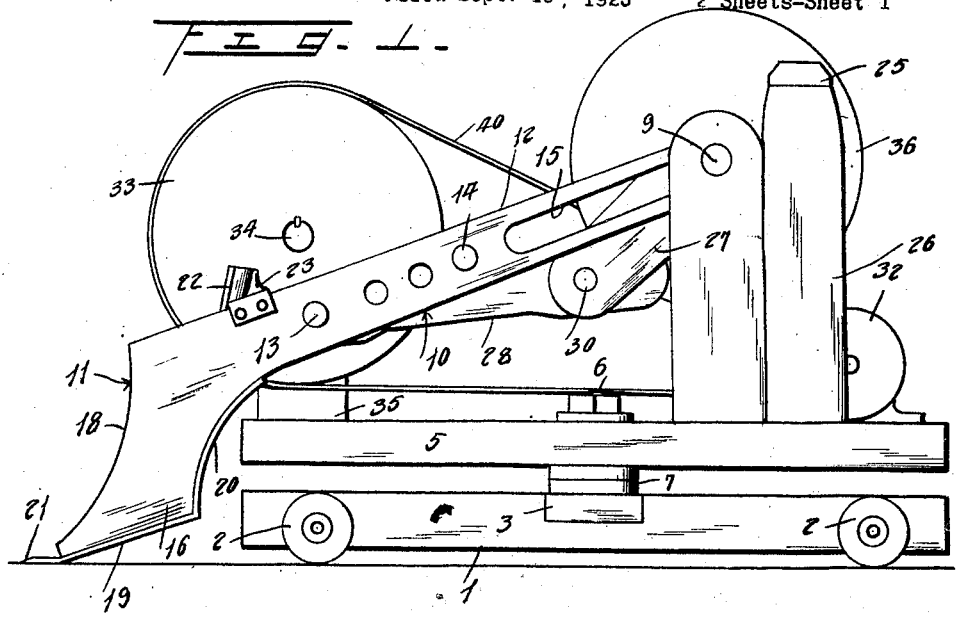
Figure 2:
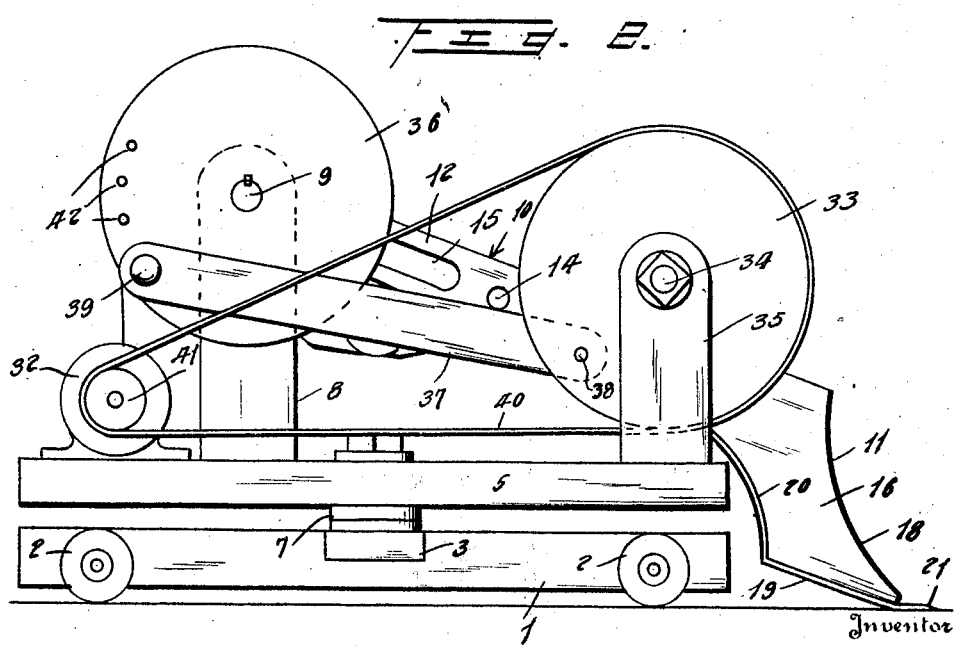
Figure 3:
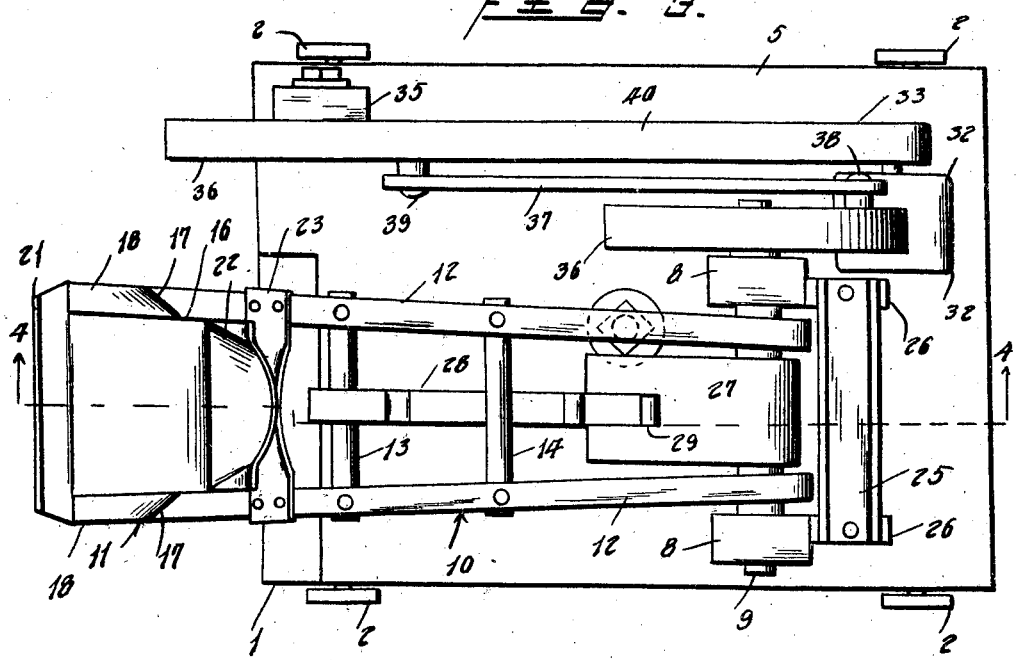
Figure 4:
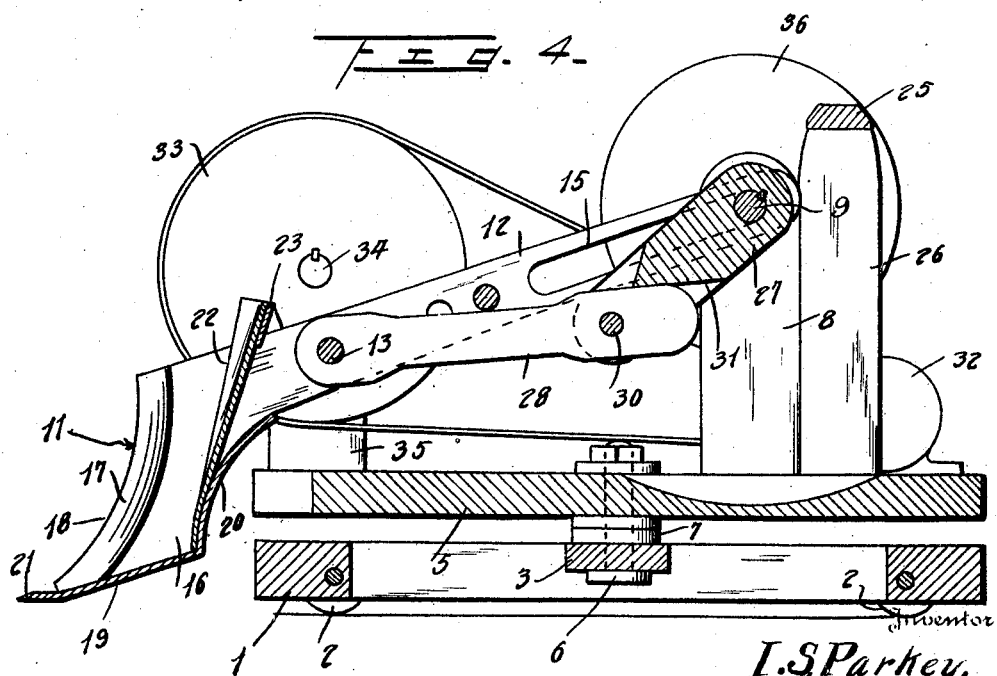

This invention relates to ditching and loading machines, and it consists of the construction, combination and arrangement of parts hereinafter fully described and claimed, and illustrated in the accompanying drawings, wherein:

Figure 1 is a view in side elevation of a ditching and loading machine constructed in accordance with my invention, Figure 2 is a similar view looking at the opposite side of the machine, Figure 3 is a top plan view of the machine, and Figure 4 is a sectional view taken on the vertical plane indicated by the line 4—4 of Figure 3.

Corresponding and like parts are referred to in the following description, and designated in the several views of the accompanying drawings, by similar reference characters.

The ditching and loading machine comprises a frame 1 which is supported by wheels 2 and which include a centrally located bar 3. A platform 5 is secured to the frame 1 for rotation about a vertical axis by means of a bolt 6 which passes through the bar 3 and platform 5. Plates 7 positioned upon the bolt 6 between the bar 3 and platform 5 support the latter out of contact with the frame 1. Relatively spaced standards 8 are secured to the platform 5 adjacent the rear end thereof and rotatably support a shaft 9. A lever frame 10 is pivotally and slidably connected to the shaft 9 and is provided with a scoop or shovel 11. The side bars 12 of the lever frame 10 are secured in relatively spaced relation by cross pieces 13 and 14 and are provided in their rear end portions with longitudinally extending slots 15 which receive the shaft 9 and which establish the pivotal and slidable connection between the lever frame and shaft. The front ends of the cross bars 12 are enlarged in a downward and forward direction to provide sides 16 for the scoop or shovel 11. The sides 16 are beveled as at 17 to provide arcuate cutting edges 18. The bottom 19 and back 20 of the scoop or shovel 11 are secured to the under edges of the sides 16. The bottom 19 is provided with a cutting edge or lip 21 which is located forwardly beyond the cutting edges 18 of the sides 16.

A chute 22 is arranged at the rear side of the scoop or shovel 11 and is of arcuate formation in cross section. The upper end of the chute 22 extends beyond the upper side of the lever frame 10 and is supported by a cross piece 23 secured to said frame. The chute 22 will, when the scoop or shovel 11 is in discharging position, direct the contents thereof into a wagon when the device is used as a loader and to one side of the device when it is use as a ditcher.

When the scoop or shovel 11 is loaded, the lever frame 10 is at its greatest extension from the shaft 9, and it is adapted to be swung on the shaft in this position with respect thereto into an upwardly and rearwardly inclined position in order to discharge the load of the scoop or shovel. The lever frame 10 will when in this position rest against a stop 25 which is supported rearwardly of and above the shaft 9 by uprights 26 carried by the platform 5. After the load of the scoop or shovel 11 has been discharged, the lever frame 10 is moved downwardly on the shaft 9, and it is then swung downwardly and forwardly to place the scoop or shovel in position to receive another load. The lever frame 10 is thence moved forwardly with respect to the shaft 9, and during this movement the scoop or shovel 11 gathers its load.

The lever frame 10 is operated in the manner stated to load the scoop or shovel 11 and to discharge the load thereof through the medium of a crank 27 keyed to the shaft 9 between the side bars 12 on the lever frame and a link 28 pivoted at its front end to the cross piece 13 and at its rear end to the outer end of the crank 27, and by alternately rocking the shaft 9 in counter and clockwise directions. The outer end of the crank 27 is provided with a slot 29 to receive the rear end of the link 28 which is pivoted to the crank in advance of its rear end by a pin 30. The wall 31 of the slot 29 contacts with the upper edge of the rear end of the link 28, and due thereto this part and the crank 27 are locked against relative pivotal movement during the swinging of the lever frame 10 into scoop or shovel discharging position, and during this movement of the lever frame the link 28 is held against pivotal movement in one direction with respect to the frame by the cross piece 14 with which the upper edge of the link 28 contacts during this movement of the lever frame.

The operating means for the shaft 9 comprises a motor 32 secured to the platform 5, a drive wheel 33 keyed to a stub shaft 34 journaled on an upright 35 carried by the platform, a wheel 36 keyed to the shaft 9, a link 37 connected to a wrist pin 38 having a fixed position on the drive wheel 33 and to a wrist pin 39 carried by the wheel 36, and a belt 40 passing about a pulley 41 on the drive shaft of the motor 32 and about the wheel 33. The wheel 36 is provided with a series of openings 42 in a selected one of which the wrist pin 39 is secured. The openings 42 permit the wrist pin 39 to be positioned upon the wheel 36 to regulate the sliding movement of the lever frame 10 with respect to the shaft 9.

From the foregoing description, taken in connection with the accompanying drawings, the advantages of the construction and of the method of operation of the invention will be readily apparent to those skilled in the art to which it appertains. While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. A machine of the character described, comprising a shaft, means for oscillating the shaft, a lever pivotally and slidably connected to the shaft, a scoop or shovel carried by the lever, a crank fixed to the shaft and provided with a stop, a link pivotally connected to the lever and crank and cooperating with said stop, and a stop carried by the lever for contact by the link.

2. A machine of the character described, comprising a shaft, means for oscillating the shaft, a lever frame provided with slots to receive the shaft, a scoop or shovel carried by the lever frame, a crank fixed to the shaft and provided with a stop, a link pivotally connected to the lever frame and crank and cooperating with said stop, and a stop connected to the lever frame for contact by the link.

3. A machine of the character described, comprising a wheeled frame, a platform rotatably mounted upon the frame, a shaft journaled upon the platform, shaft operating means carried by the platform, a lever having a pivotal and slidable connection with the shaft, a scoop or shovel carried by the lever, a crank fixed to the shaft and provided with a stop, a link pivotally connected to the lever and crank and cooperating with the stop of the latter, and a stop carried by the lever for contact by the link.

4. A machine of the character described comprising a platform, a support having a fixed position on said platform, a shaft journaled in said support, a lever slidably and pivotally connected to said shaft, a scoop or shovel carried by said lever, a crank fixed to said shaft, means establishing an operative connection between said shaft and lever, and means for oscillating said shaft.

5. A machine of the character described comprising a platform, a support having a fixed position on said platform, a shaft journaled in said support, a lever slidably and pivotally connected to said shaft and a scoop or shovel carried by said lever; means establishing an operative connection between said shaft and lever, and means for oscillating said shaft, and adjustable to vary the oscillations thereof.

In testimony whereof I affix my signature.

ISAAC S. X PARKEY.
his mark